United States Patent [19]

Iwanami et al.

[11] Patent Number: 4,774,851
[45] Date of Patent: Oct. 4, 1988

[54] APPARATUS FOR ADJUSTING POSITION OF STEERING WHEEL

[75] Inventors: Hiroshi Iwanami, Nabari; Yoshiyuki Nakamura, Nara, both of Japan

[73] Assignee: Koyo Seiko Kabushiki Kaisha, Osaka, Japan

[21] Appl. No.: 40,266

[22] Filed: Apr. 17, 1987

[30] Foreign Application Priority Data

Apr. 18, 1986 [JP] Japan ................................. 61-87888

[51] Int. Cl.$^4$ ............................................. B62D 1/18
[52] U.S. Cl. ...................................... 74/493; 74/492; 74/531; 188/371
[58] Field of Search ........................ 74/492, 493, 531; 188/371

[56] References Cited

U.S. PATENT DOCUMENTS

| | | | |
|---|---|---|---|
| 3,538,785 | 11/1970 | Grancon | 74/492 |
| 3,788,148 | 1/1974 | Connell et al. | 74/492 |
| 4,407,166 | 10/1983 | Protze et al. | 74/493 |
| 4,509,386 | 4/1985 | Kimberlin | 74/492 |
| 4,516,440 | 5/1985 | Nishikawa | 74/493 |
| 4,541,298 | 9/1985 | Strutt | 74/493 |
| 4,627,306 | 12/1986 | Berenjian | 74/492 |

FOREIGN PATENT DOCUMENTS 60-52022 11/1985 Japan.

*Primary Examiner*—Allan D. Herrmann
*Attorney, Agent, or Firm*—Bruce L. Adams; Van C. Wilks

[57] ABSTRACT

A vehicle steering column is comprised of a lower column mounted to undergo angular displacement around one end portion thereof and an upper column telescopically connected to the other end portion of the lower column to undergo angular displacement together with the lower column and linear displacement relative to the lower column along a column axis. A plurality of ball members are disposed between the lower and upper columns for restraining free linear displacement of the upper column to thereby allow the upper column to undergo frictional linear displacement in response to the application of a given amount of force to the upper column. A support member is engaged with the upper column for restraining free angular displacement of the upper column to thereby allow the upper column to undergo stepwise angular displacement in response to the application of a given amount of force to the upper column.

18 Claims, 4 Drawing Sheets

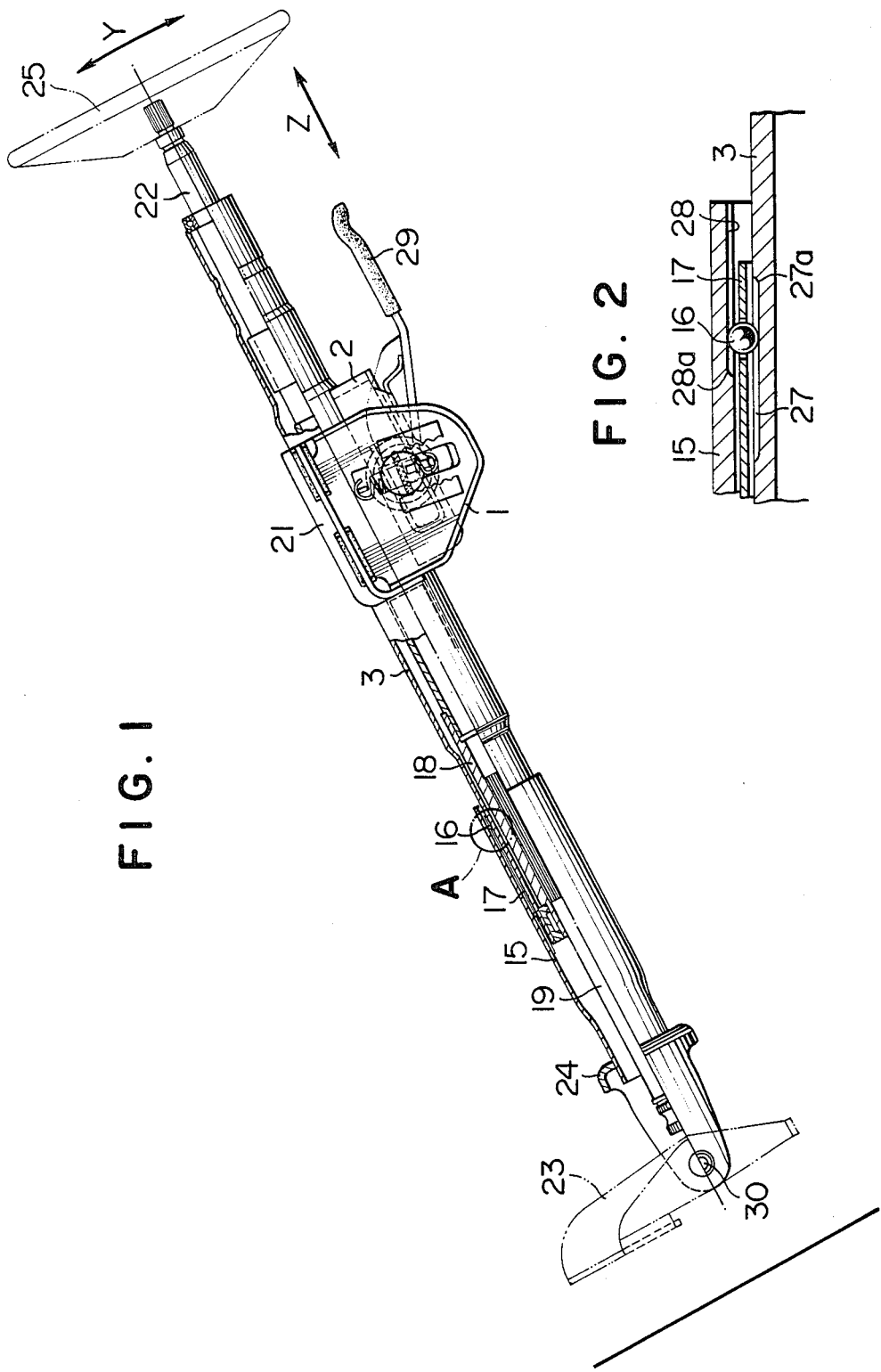

APPARATUS FOR ADJUSTING POSITION OF STEERING WHEEL

FIELD AND BACKGROUND OF THE INVENTION

The present invention relates to an apparatus for adjusting position of a steering wheel for motor vehicles, and more particularly to a position adjusting apparatus applied to a steering wheel provided with an energy absorbing column for absorbing shocks.

In the past, the steering wheel which position is adjustable according to the physique and preference of the driver includes: (1) a tilt system provided with a tiltable steering column wherein a steering shaft is tilted forward and backward around a position in the vicinity of the lower end thereof to make adjustable the mounting angle of inclination of the steering shaft to the vehicle body; (2) a telescopic system wherein a steering shaft is made telescopically so that a position of a steering wheel can be adjusted in an axial direction of the steering shaft; (3) a tilt and telescopic system in which the above systems (1) and (2) are combined; and (4) a system of collision relaxing apparatus provided with an energy absorbing steering column designed such that in order to absorb the shock caused by a steering wheel to the driver at the time of a collision accident of the vehicle or the like, when the steering wheel was subjected to pressure above a given value, a steering shaft tends to reduce its own length in an axial direction while absorbing energy caused by the shock. The aforesaid system (2) is disclosed, for example, in U.S. Pat. No. 4,516,440 issued May 14, 1985 to Nishikawa, and the aforesaid system (4) is disclosed, for example, in U.S. Pat. No. 4,627,306 issued Dec. 9, 1986 to Berenjian. Moreover, a further system in which the aforesaid system (4), the system of collision relaxing apparatus, is combined with the aforesaid system (2), the telescopic system, i.e., the position adjusting apparatus in the direction of the steering shaft, is disclosed, for example, in Japanese Patent Publication No. 60-52022 (Nov. 16, 1985).

However, in the above-described apparatus for adjusting position of the steering wheel in the direction of the steering shaft, when the adjustment of position is performed, the clamp by which the steering wheel has been restrained to a certain position is first released to bring the steering wheel into a telescopic state, then the position corresponding to the optimum length of the steering shaft is determined for the driver, and thereafter, re-clamping is carried out to provide locking so as not to allow the steering shaft to effect further telescopic motion. However, this has suffered from inconveniences that at the moment when the clamp is released, the steering shaft totally loses its restraint and is telescopically released so that the steering wheel becomes movable toward the steering shaft, and therefore the position so far occupied by the steering wheel becomes unknown, as a consequence of which the fine adjustment at that position cannot be performed. It is of course that such an inconvenience likewise occurs even in the system combined with the aforementioned shock releasing apparatus.

SUMMARY OF THE INVENTION

It is an object of the present invention to overcome the aforementioned disadvantages. The present invention provides an apparatus for adjusting position of a steering wheel constructed described below. Namely, there is provided an arrangement wherein upper and lower shafts telescopically connected to each other are rotatably supported by upper and lower columns, respectively, both of the columns being telescopically connected to each other. A mounting position of the upper column to the vehicle body is made variable to vary the position of a steering wheel, in which balls are inserted under pressure into a clearance in an overlapped portion between the columns, and a ball run-on step on which the ball is run on is provided at the end of movement of the ball in the axial direction of the columns.

In the apparatus for adjusting position of the steering wheel according to the present invention constructed as described above, when a clamp of the upper column to the vehicle body is released to adjust the length of a steering shaft, the upper shaft is telescoped relative to the lower shaft accordingly. With this, the position of the steering wheel in the direction of the steering shaft can be adjusted. However, both the columns, when being newly adjusted, are not further telescoped easily but are maintained as they are by virtue of the frictional resistance between the balls inserted under pressure into the overlapped portion between the upper and lower columns and the peripheral surface of the respective column. On the other hand, an excessive pressure applied to the steering wheel at the time of the collision accident of the vehicle or the like acts so as to compress both the columns each other in the direction of the steering shaft. The initial compressive motion is carried out against the frictional force of the balls, and after the balls have reached the ball run-on step; the compressive motion is carried out against the resistance resulting from the running-on of the balls onto the groove. Thus, kinetic energy accompanied by the compressive motion is absorbed in two stages.

As described above, in the present invention, the upper and lower columns are telescoped while being subjected to the frictional resistance caused by the balls inserted under pressure into the overlapped portion therebetween, and therefore, at the moment of unlocking, the previous locked position is never deviated and the fine adjustment for the purpose of positioning can be carried out with the original locked position as a reference. Furthermore, shock energy at the time of collision is absorbed also by the frictional resistance resulting from the initial rolling of balls prior to the runningon of balls onto the run-on step and the energy absorption is effected in the two stages. Therefore, absorption of collision to the driver can be more effectively carried out.

The above object, advantages, features and uses of the present invention will become more apparent from the following description in connection with the accompanying drawings.

BRIEF DESCRIPTION OF THE DRAWINGS

FIG. 1 is a side view showing an embodiment of the present invention;

FIG. 2 is an enlarged view of a portion indicated at a circle A in FIG. 1;

DESCRIPTION OF THE PREFERRED EMBODIMENT

Figure 3:
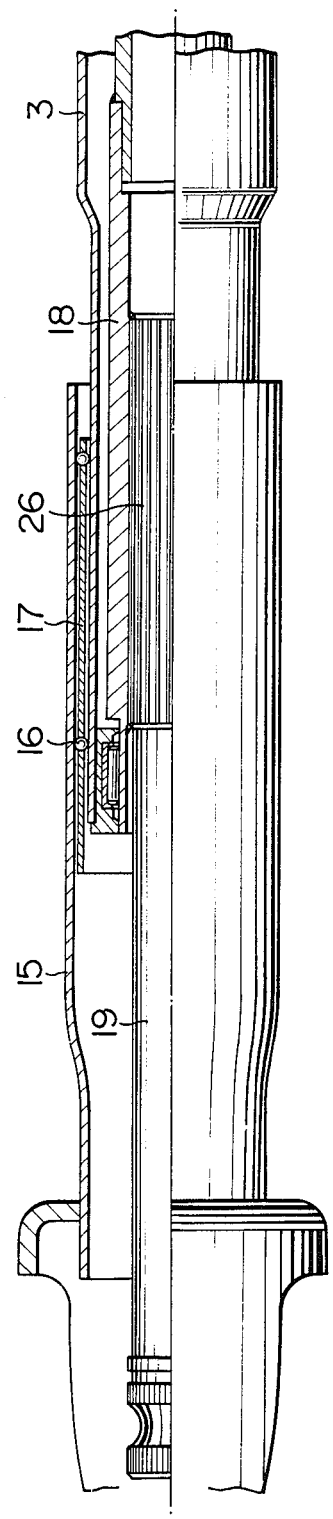
FIG. 3 is a side view showing in detail the essential parts of the present invention.

An embodiment is disclosed in the accompanying drawings, in which the present invention is applied to an apparatus for a position of a steering wheel in combination with the aforementioned tilt system and the telescopic system for adjusting an axial position. Referring to FIG. 1, a steering shaft 22 having a steering wheel 25 mounted at the upper end thereof and having the lower end connected to a steering mechanism (not shown) is composed of an upper shaft 18 and a lower shaft 19, both of the shafts being connected telescopically in the axial direction of the shafts by splines 26 (see FIG. 3) and being surrounded by an upper column 3 and a lower column 15 being supported rotatably around the axis of the shafts. The upper column 3 and the lower column 15 are telescopically fitted, and a plurality of balls 16 are inserted under pressure into a clearance in an overlapped portion therebetween so that they are disposed along the circumferences of the columns 3 and 15 as shown in FIG. 2. More specifically, these balls 16 are fitted into closed-end grooves 27 and 28 respectively formed in the outer peripheral surface of the upper column 3 and the inner peripheral surface of the lower column 15 so that they are placed in contact with the grooves 27 and 28 under fixed pressure. A ball holder 17 for defining positions of the plurality of balls is inserted into a clearance in the overlapped portion between the columns 3 and 15. The upper column 3 is mounted on the vehicle body (not shown) so that a mounting position thereof can be adjusted as will be described later, and the lower end of the lower column 15 is secured to a casing 24 for a lower bracket 23.

A locking lever 29 is actuated so that the upper column 3 can be locked into the locked state to the vehicle body and can be released from the locked state. In the unlocked state of the upper column 3, both the columns 3 and 15 and the steering shaft 22 can be integrally swung forward and backward of the vehicle or angularly displaced around a hinge portion 30 of the lower bracket 23 secured to the vehicle body, and the position of the steering wheel 25 can be changed up and down (in the direction as indicated by the arrow Y in FIG. 1). Accordingly, the adjustment of the tilt system can be effected adjusted. It is also designed so that in the unlocked state, the upper column 3 can be linearly displaced in the direction of the column axis (in the direction as indicated by the arrow Z in FIG. 1). This movement causes the upper column 3 to move forward and backward with respect to the lower column, and the steering shaft 22 is telescoped longitudinally accordingly. Thus, the position of the steering wheel 25 may be adjusted in the axial direction of the steering shaft (in the direction as indicated by the arrow Z of FIG. 2).

Figure 4:
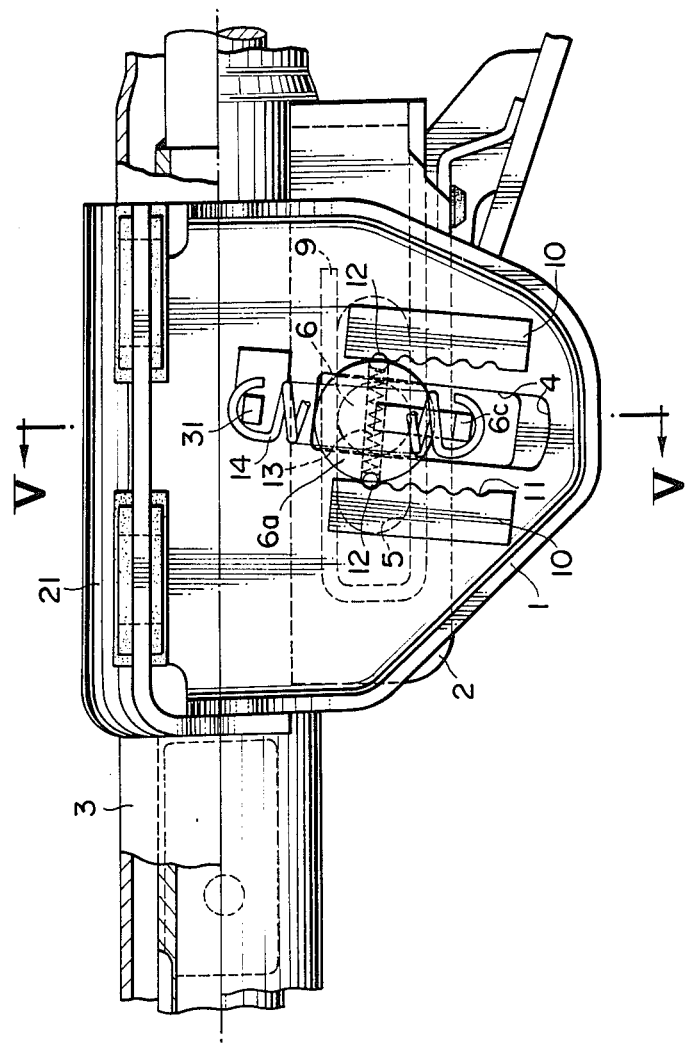
FIG. 4 is a side view of the supporting bracket partially showing its structure.
Figure 5:
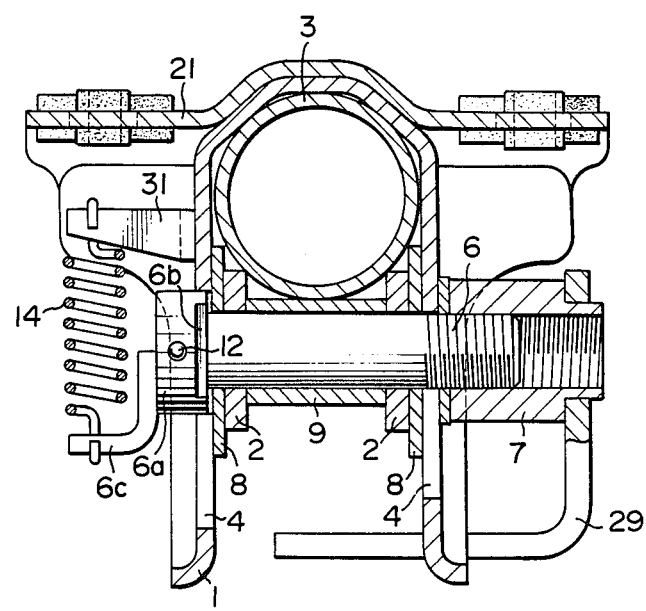
FIG. 5 is a sectional view taken on line V—V of FIG. 4.

The adjustment of the mounting position of the upper column 3 as previously mentioned is carried out by means of the arrangement shown in FIGS. 4 and 5. Namely, a stationary frame in the form of a supporting bracket 1 is secured to the vehicle body (not shown) through a mounting member 21 assembled with the supporting bracket 1 while embracing the upper column 3 from both sides. The upper column 3 is assembled with and fixed to a movable frame in the form of a column bracket 2, and a bolt 6 extends through an intersection between a horizontal or transverse slot 5 formed on the column bracket 2 in a direction of the axis of the steering shaft and a vertical slot 4 shown in FIGS. 4 and 5 formed on the supporting bracket 1. The bolt 6 is prevented from rotation thereof by fitting a plane portion 6b provided on the side of a head 6a of the bolt 6 into the vertical slot 4, the bolt being fastened to the supporting bracket 1 by means of a nut 7 operated by a locking lever 29. Cooperation between a washer 8 interposed between the supporting bracket 1 and the column bracket 2 and a tubular spacer 9 secured to the column bracket 2 causes the tightening force of the nut 7 to create the frictional force between the supporting bracket 1 and the column bracket 2 through the washer 8. This frictional force maintains the locked state of the upper column 3 assembled with the column bracket 2 with respect to the supporting bracket 1. However, the magnitude of this frictional force is such that when an abnormal compressive load as in the collision of the vehicle or the like is applied in the axial direction of the steering shaft, the upper column 3 is allowed to be released from the locked state relative to the supporting bracket 1 and allowed to be slidably moved in the axial direction of the steering shaft. A pin 31 and a pin 6c are projected from the outer surface of the supporting bracket 1 and from the head 6a of the bolt 6, respectively, and a spring 14 is extended between these pins. This spring 14 is used to obtain the force for bearing the weights of the steering shaft 22 and the steering wheel 25 loaded on the supporting bracket 1 through the upper column 3, the column bracket 2, the bolt 6, etc. On the outer surface of the supporting bracket 1 is disposed a pair of stationary ball engaging members 10 along the opposite sides of the vertical slot 4. The head 6a of the bolt 6 is formed with a through-hole, and each of the opposite ends of a compression spring 13 inserted into the through-hole has one ball 12 which is extruded toward the respective and opening of the through-hole. The balls 12 are resiliently fitted in a pair of engaging grooves 11 provided in the ball engaging member 10 so that the vertical movement along the slot 4 of the bolt 6 can be carried out stepwisely.

The operation of the apparatus according to the present invention constructed as described above is as follows.

When the locking lever 29 is actuated to loosen the nut 7, the bolt 6 and the column bracket 2 is unfastened with respect to the supporting bracket 1 to release the locking of the upper column 3 with respect to the vehicle body. When the steering wheel 25 is moved up and down in the tilting manner under the unlocked state, the upper column 3 swings together with the lower column 15 and the steering shaft 22 around the hinge portion 30 of the lower bracket 23 secured to the vehicle body.

At that time, the bolt 6 is moved within the vertical slot 4 in a longitudinal direction thereof provided in the supporting bracket 1 to make it possible to adjust the tilting height with respect to the steering wheel 25. At that time, the balls 12 urged by the spring 13 cooperate with the ball engaging members 10 each secured to the opposite sides of the vertical slot 4 to allow the stepwise movement of the bolt 6 within the slot 4, thus preventing the position of the steering shaft 22 and thus the steering wheel 25 from being deviated more than a needed amount at a time.

When in this state, the steering wheel 25 is likewise moved in the axial direction of the steering shaft 22, the upper column 3 is moved together with the upper shaft 18 in the axial direction of the steering shaft to effect the expansion and contraction of the length of the steering shaft 22. Since at that time, the bolt 6 can be moved to left and right as viewed in the figure within the axial or horizontal slot 5, the adjustment of the position in the shaft direction of the steering shaft 22 and the steering wheel 25 becomes possible. Since the telescopic operation of the steering shaft 22 is carried out under the state where moderate resistance is applied by virtue of the frictional force between the balls 16 inserted under pressure into the clearance in the overlapped portion between the upper column 3 and the lower column 15, the steering shaft is prevented from being extended and contracted unnecessarily at a time unlike the prior art which assumes a completely unstrained or free condition at the moment the locking is released.

When the locking level 29 is actuated to tighten the nut 7, the initial locked state is restored, and the upper column 3 is supported on the supporting bracket 1 by virtue of the fixed frictional force. This locked state of the upper column 3 by the supporting bracket 1 is not affected by the regular steering operation.

When the excessive force is applied to the steering wheel 25 due to the collision or the like of the vehicle, the supporting bracket 1 allows the movement of the upper column 3. Consequently, the upper column 3 rushes into the lower column 15 and the steering shaft 22 becomes shortened. In the early time of the shortening motion, the motion of the upper column 3 is braked by the friction between the balls 16 and the peripheral surfaces of the respective columns 3 and 15 in addition to the friction between the upper column 3 and the supporting bracket 1, and finally, the balls 16 run on the ends 27a and 28a of the closed-end grooves 27 and 28, respectively, and are pressed between the said ends and subjected to braking. Therefore, kinetic energy resulting from the contracting motion can be absorbed in the two-step manner.

It is noted that the present invention may be carried out in other methods without departing from the spirit and essential features thereof. For example, in the abovementioned embodiment, the balls 16 have been fitted into the grooves 27 and 28. The grooves 27 and 28 are not necessarily provided, but such grooves may also be formed by pressured insertion of the balls 16 into the clearance in the overlapped portion between the columns 3 and 15. In short, it is necessary to insert the balls 16 under pressure into the clearance in the overlapped portion between the columns 3 and 15 and to provide run-on stepped portions (corresponding to the aforesaid ends 27a and 28a). Furthermore, means other than those in the embodiment which has been illustrated and described would be obviously understood for those skilled in the art. Accordingly, the preferred embodiment illustrated in the present specification is a mere illustration and not in a limited sense.

The scope of the invention is defined in the appended claims, and all the modified forms falling under the meaning of these claims are included in the present invention.

What is claimed is:

1. An apparatus for adjusting a position of a steering wheel relative to a vehicle body, the apparatus comprising:
   a set of an upper column and a lower column which are telescopically connected to each other, the column set rotatably supporting therein a steering shaft connected to the steering wheel;
   a supporting bracket fixed to the vehicle body and having two side walls between which the upper column is received and in each of which is formed a vertical slot extending perpendicular to an axis of the upper column;
   a column bracket fixed to the upper column and received between the two side walls of the supporting bracket, the column bracket having two flat surface portions which bear against the inside surfaces of the respective two side walls of the supporting bracket and in each of which is formed a transverse slot extending perpendicular to and across the vertical slot;
   a bolt non-rotatably extending through the two vertical slots and the two transverse slots, the bolt having a head and a threaded portion which project out of the vertical slots, respectively;
   a clamping nut rotatably fitted onto the threaded portion of the bolt to bear the bottom of the nut against the outside surface of one of the side walls of the supporting bracket;
   a plurality of balls rotatably inserted into a clearance which is formed in a telescopically overlapped portion between the upper and lower columns, the balls being held in frictional contact with two opposed surfaces of the upper and lower columns in the clearance such that when the clamping nut is loosened, the displacement of the upper column relative to the lower column is not allowed to occur spontaneously but can be manually prompted; and
   engaging means for stepwisely displaceably engaging the bolt head with the supporting bracket, the engaging means comprising a pair of ball engaging members disposed on the outside surface of one of the side walls of the supporting bracket adjacent to the bolt head, the ball engaging members extending along the vertical slot in opposed relation relative to the vertical slot formed in said one of the side walls, each of the engaging members having a plurality of engaging grooves in its surface facing the other engaging member, a spring extending in a through-hole pierced across the bolt head through the center thereof to form openings at the opposite side surfaces thereof, and a pair of balls which are half-extruded out of the respective openings of the through-hole by means of the spring and fitted in the opposite engaging grooves of the respective two ball engaging members so that when the clamping nut is loosened, the bolt can be manually displaced stepwise along the two vertical slots.

2. An apparatus according to claim 1; wherein the column bracket is provided with a spacer interposed between the two flat surface portions of the column bracket and extending along at least one edge of the respective two transverse slots.

3. An apparatus according to claim 1; wherein the two flat surface portions of the column bracket bear directly or indirectly against the inside surfaces of the respective two side walls of the supporting bracket.

4. An apparatus according to claim 1; wherein the clamping nut is provided with a lever which is fixed at its one end to the clamping nut for rotating the clamping nut.

5. An apparatus according to claim 1; wherein the head of the bolt has a flat cutout portion on the side surface thereof for slidably contacting with a vertical edge of the vertical slot to thereby make the bolt non-rotatable relative to the supporting bracket and the column bracket.

6. An apparatus for adjusting a position of a steering wheel relative to a vehicle body, the apparatus comprising:
- a set of an upper column and a lower column which are telescopically connected to each other, the column set rotatably supporting therein a steering shaft connected to the steering wheel;
- a supporting bracket fixed to the vehicle body and having two side walls between which the upper column is received and in each of which is formed a vertical slot extending perpendicular to an axis of the upper column;
- a column bracket fixed to the upper column and received between the two side walls of the supporting bracket, the column bracket having two flat surface portions which bear against the inside surfaces of the respective two side walls of the supporting bracket and in each of which is formed a transverse slot extending perpendicular to and across the vertical slot;
- a bolt non-rotatably extending through the two vertical slots and the two transverse slots, the bolt having a head and a threaded portion which project out of the vertical slots, respectively;
- a clamping nut rotatably fitted onto the threaded portion of the bolt to bear the bottom of the nut against the outside surface of one of the side walls of the supporting bracket;
- a plurality of balls rotatably inserted into a clearance which is formed in a telescopically overlapped portion between the upper and lower columns, the balls being held in frictional contact with two opposed surfaces of the upper and lower columns in the clearance such that when the clamping nut is loosened, the displacement of the upper column relative to the lower column is not allowed to occur spontaneously but can be manually prompted;
- engaging means for stepwisely displaceably engaging the bolt head with the supporting bracket, the engaging means comprising a pair of ball engaging members disposed on the outside surface of one of the side walls of the supporting bracket adjacent to the bolt head, the ball engaging members extending along the vertical slot in opposed relation relative to the vertical slot formed in said one of the side walls, each of the engaging members having a plurality of engaging grooves in its surface facing the other engaging member, a spring extending in a through-hole pierced across the bolt head through the center thereof to form openings at the opposite side surfaces thereof, and a pair of balls which are half-extruded out of the respective openings of the through-hole by means of the spring and fitted in the opposite engaging grooves of the respective two ball engaging members so that when the clamping nut is loosened, the bolt can be manually displaced stepwise along the two vertical slots; and
- bearing means for elastically supporting the bolt against weights of the steering shaft and the steering wheel loaded on the bolt, the bearing means comprising two pins, one of which is projected outwardly from the bolt head and the other of which is projected outwardly from an outside surface portion of the supporting bracket apart from and over the bolt head, and a spring extending between the two pins and connected at both ends thereof to the two pins.

7. An apparatus according to claim 6; wherein the column bracket is provided with a spacer interposed between the two flat surface portions of the column bracket and extending along at least one edge of the respective two transverse slots.

8. An apparatus according to claim 6; wherein the two flat surface portions of the column bracket bear directly or indirectly against the inside surfaces of the respective two side walls of the supporting bracket.

9. An apparatus according to claim 6; wherein the clamping nut is provided with a lever which is fixed at its one end to the clamping nut for rotating the clamping nut.

10. An apparatus according to claim 6; wherein the head of the bolt has a flat cutout portion on the side surface thereof for slidably contacting with a vertical edge of the vertical slot to thereby make the bolt non-rotatable relative to the supporting bracket and the column bracket.

11. A vehicle steering column apparatus comprising: a lower column mounted to undergo angular displacement around one end portion thereof; an upper column telescopically connected to the other end portion of the lower column to undergo angular displacement together with the lower column and linear displacement relative to the lower column along a column axis; first restraining means disposed between the lower and upper columns for restraining free linear displacement of the upper column to thereby allow the upper column to undergo frictional linear displacement in response to the application of a given amount of force to the upper column; a stationary frame having a pair of opposed vertical slots extending perpendicular to the column axis; a movable frame fixed to the upper column to undergo angular and linear displacements therewith and having a pair of opposed horizontal slots extending parallel to the column axis, the movable frame being engaged with the stationary frame movably relative to the stationary frame such that the vertical and horizontal slots intersect with each other to define therebetween a pair of opposed intersections; clamp means inserted into the opposed intersections and operable during other than the linear and angular displacements of the upper column for locking the movable frame to the stationary frame and operable during the linear and angular displacements of the upper column for unlocking the movable frame from the stationary frame to thereby allow the movable frame to move along the horizontal and vertical slots, respectively; and second restraining means for restraining free angular displacement of the upper column to thereby allow the upper column to undergo stepwise angular displacement in response to the application of a given amount of force to the upper column, the second restraining means comprising a pair of stationary members disposed on the stationary frame in opposed relation relative to one of the vertical slots and having thereon a plurality of pairs of opposed grooves arranged along that one vertical slot, and a movable member mounted in one end portion of the clamp means which extends through that one vertical slot between the pair of stationary members for movement with the clamp means which carries thereon the upper column through the movable frame, the movable member having a pair of opposed end portions urged away from each other for resiliently engaging with one of the pairs of grooves to thereby allow the upper column to undergo stepwise angular displacement.

12. A vehicle steering column apparatus according to claim 11; wherein the first restraining means includes a plurality of ball members disposed in a telescopically overlapped portion between the upper and lower columns in frictional contact therewith.

13. A vehicle steering column apparatus according to claim 11; wherein the clamp means includes a bolt member inserted into the opposed intersections, and a nut member rotatably threadedly engaged with the bolt member to lock the movable frame to the stationary frame.

14. A vehicle steering column apparatus according to claim 13; wherein the clamp means includes a manually operable lever connected to the nut member for manually rotating the nut member.

15. A vehicle steering column apparatus according to claim 13; wherein the bolt member has a flat cutout portion on the side surface thereof for slideably contacting with an edge of the vertical slot to thereby restrict the rotation of the bolt member relative to the stationary frame.

16. A vehicle steering column apparatus according to claim 11; wherein the movable member of the second restraining means comprises a longitudinal spring member mounted through one end portion of the clamp means, and a pair of ball members attached to opposed end portions of the longitudinal spring member.

17. A vehicle steering column apparatus according to claim 11; including supporting means for elastically supporting the clamp means relative to the stationary frame against the weight loaded on the clamp means.

18. A vehicle steering column apparatus according to claim 17; wherein the supporting means comprises a first pin member protruding from the clamp means, a second pin member protruding from the stationary frame above the first pin member, and a spring member engaged between the first and second pin members.

* * * * *